United States Patent [19]
Ingram

[11] 3,760,587
[45] Sept. 25, 1973

[54] HYDRAULIC BRAKING SYSTEMS FOR VEHICLES

[75] Inventor: Brian Ingram, Barsall Common, England

[73] Assignee: Girling Limited, Birmingham, England

[22] Filed: July 2, 1971

[21] Appl. No.: 159,344

[52] U.S. Cl.............................................. 60/54.6 E
[51] Int. Cl............................................... F15b 7/00
[58] Field of Search.................... 60/54.5 P, 54.6 P, 60/54.6 E; 188/359

[56] References Cited
UNITED STATES PATENTS
2,531,705  11/1950  Schultz.......................... 60/54.6 R
2,060,854  11/1936  Carroll............................ 60/54.6 R
2,992,533  7/1961  Hodkinson....................... 188/359
3,237,411  3/1966  Taft................................. 188/359

Primary Examiner—Martin P. Schwadron
Assistant Examiner—A. M. Zupcic
Attorney—Imirie & Smiley

[57] ABSTRACT

In a master cylinder for an hydraulic braking system a piston works through first and second axially spaced seals fixed in a bore in a cylinder body. A space between the seals for connection through an inlet port to a reservoir for hydraulic fluid is normally in communication with a pressure space in the bore in advance of the piston through a recuperation port in the piston. When the piston is advanced into the pressure space the recuperation port is closed by one of the seals and thereafter further movement of the piston in the same direction pressurises hydraulic fluid in the pressure space.

2 Claims, 1 Drawing Figure

PATENTED SEP 25 1973 3,760,587
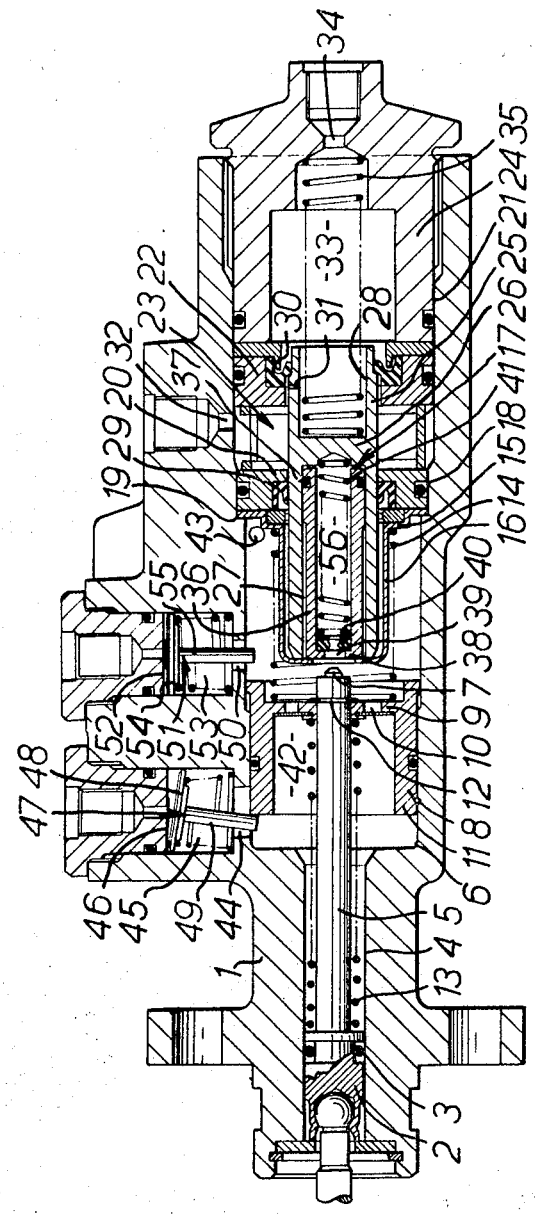
INVENTOR
BRIAN INGRAM 3,760,587

HYDRAULIC BRAKING SYSTEMS FOR VEHICLES

This invention relates to improvements in hydraulic braking systems for vehicles of the kind in which slave cylinders for actuating brakes are supplied with fluid under pressure from a pump or other source of pressure fluid under the control of a master cylinder actuated by a pedal, in addition to a second source of pressure generated from an hydrostatic supply. More particularly, our invention is concerned with a new or improved master cylinder for use in an hydraulic braking system, for example, of the kind set forth.

The master cylinder forming the subject matter of this application was first described in our U.S. Pat. application Ser. No. 18,039, from which this Application is divided.

According to our invention a master cylinder for use in an hydraulic braking system comprises a cylinder body, first and second axially spaced stationary annular seals fixed in a bore in the cylinder body, a piston working through the seals, an inlet passage in the cylinder body communicating with a space in the bore between the seals and adapted to be connected to a reservoir for hydraulic fluid, a pressure space defined by a position of the bore beyond one end of the piston and the first seal which is located adjacent to the said one end of the piston, a recuperation port on the piston normally providing communication between the space between the seals and the pressure space, and an outlet port communicating with the pressure space and adapted to be connected to a wheel brake, the arrangement being such that when the piston is advanced in the bore into the pressure space, the recuperation port is closed by the first seal and thereafter further movement of the piston in the same direction pressurises hydraulic fluid in the pressure space.

Preferably the seals are provided with inwardly directed continuous radial lips which seal at all times with the outer peripheral wall of the piston.

Conveniently an axially extending recess in the said one end of the piston opens into the pressure space and the recuperation port comprises a radial port in the piston normally providing communication between the space between the seals and the recess.

Conveniently the said one end of the piston is at the free end of a portion of reduced diameter which extends axially inwardly beyond the first seal and into the space defined between the seals when the piston is in a normal inoperative retracted position, the recuperation port being provided in a portion of the piston of full diameter and being spaced from the inner end of the portion of reduced diameter.

When the piston is advanced in the bore the end portion of reduced diameter sweeps through the first seal which in turn seals against the full diameter of the piston at a point inwardly of the recuperation port.

An effective seal is formed between the two stationary seals and the external surface of the piston surface simply by ensuring that the external surface of the piston is provided with a finish of high quality. This, in turn, conserves the life of the seals themselves.

Furthermore, installation of the master cylinder is facilitated in that the effective length of the cylinder body can be reduced to a minimum since the piston is supported at two spaced locations constructed and arranged in such a manner that, in an inoperative retracted position, the piston projects into the pressure space only by a minimum distance.

An embodiment of such a tandem master cylinder according to our invention is described by way of an example with reference to the accompanying drawing which is a longitudinal section.

The master cylinder illustrated comprises a body 1 having a stepped longitudinal bore. A first piston 2 provided with a seal 3 works in the portion 4 of the bore of smaller diameter and is provided with an axial extension 5 in the form of an imperforate rod. The rod 5 extends into the portion 6 of the bore of greater diameter and terminates at its inner end in a nose portion 7 of reduced diameter.

A follower or cage assembly 8 slidably mounted on the imperforate rod 5 at an intermediate point in its axial length includes a radial flange 9 provide with a plurality of ports 10 and an annular shroud 11 extending axially in opposite directions with respect to the flange 9 and working in the bore portion 6. The inner face of the flange 9 is held in abutment with a collar 12 on the rod 5 by a compression spring 13 acting between the first piston 2 and the flange 9 of the cage assembly 8. The cage assembly 8 together with the rod 5 and the first piston 2 are normally held in the position shown by a return spring 14 acting between the flange 9 and an outwardly extending flange 15 on the inner end of an abutment stop 16 of top-hat section enclosing the adjacent end of a secondary piston assembly 17.

The portion 6 of the stepped bore is counterbored at 18 from its outer end and a shoulder 19 at the step in diameter forms an abutment for an annular ring 20. The counterbored portion 18 is counterbored again at 21 to form a location for a second annular ring 22 which is spaced from the first by a spider or similar member 23, integral with the ring 22. The rings 20 and 22 are clamped in position by a plug 24 screwed into the outer end of the counterbore 21.

The secondary piston assembly 17 is in the form of a telescopic assembly which is slidably received in aligned central openings in the rings 20 and 22. The secondary piston assembly 17 comprises an outer piston 25 in the form of a hollow sleeve provided with an inner end portion of reduced diameter. A partition 26 closes the bore of the sleeve 25 at an intermediate point in its axial length to divide the bore into a blind bore 27 adjacent to the rod 5 and a recess 28 on the opposite side of the partition 25.

Each ring 20, 22 is formed in its inner peripheral edge with an annular recess in which is housed a seal, 29 and 30 respectively, each having a continuous radial lip. The lip of the seal 29 is in sealing engagement with the outer peripheral wall of the outer piston 25 at all times. In the inoperative position shown a port 31 in the wall of the outer piston 23 provides a communication between a radial port 32 in the wall of the body for connection to a hydrostatic reservoir for hydraulic fluid, and a pressure space 33 between the inner end of the outer piston 25 and an outlet portion 34 in a plug 24 closing the inner end of the body 1. The outlet port 34 is adapted to be connected to slave cylinders of a secondary brake circuit of a vehicle. The outer piston 25 is held in the retracted position shown in the drawings by a compression spring 35 acting between the plug 24 and the partition 26 at the base of the recess 28.

An inner piston 36 working within the blind bore 27 carries a seal 37 which has a sealing engagement with the wall of the bore 27. The inner piston 36 is hollow and is provided at its outer end with an inwardly extending radial flange 38 having a central opening 39 aligned with, and of a diameter slightly greater than the nose portion 7 at the inner end of the rod 5. An annular sealing ring 40 is held against the inner face of the flange 38 by a compression spring 41 acting between the ring 40 and the partition 26 to urge the inner and outer pistons 25 and 36 in opposite directions away from each other. The compression spring 41 is of less strength than the return spring 14 acting on the inner piston 36 through the abutment stop 16 so that the inner piston 36, at its inner end, is held against the outer piston 25.

A first or primary pressure space 42 is located in the bore of the body 1 between the first piston 2 and the secondary piston assembly 17 and is adapted to be connected to the slave cylinders of the primary brake system of the vehicle through an outlet 43.

Communication between the first or primary pressure space 42 and a reservoir is adapted to be established in the off position of brakes, through a port 44 in the wall of the cylinder body 1 leading into a chamber 45 in which is mounted a valve seat 46 surrounding an opening adapted to be controlled by a spring loaded tilting valve 47. The valve 47 comprises a head 48 having an upper face adapted to engage with the valve seat 46. The head 48 is mounted on a stem 49 of which the lower ends extends downwardly through the port 44 and into the path of the outer free end of the shroud 11 of the cage assembly 8. When the main piston 2 and the imperforate rod 5 are in their fully retracted positions illustrated, the shroud 11 engages with the lower end of the valve stem 49 to hold the valve 47 in a tilted position so that the first pressure space 42 is in free communication with the reservoir.

Communication between the first pressure space and a source of high pressure fluid, such as a pump or hydraulic accumulator, through a further port 50 in the wall of the cylinder body, is controlled by a further spring loaded tilting valve 51 cooperating with a valve seat 52 in a chamber 53 with which the port 50 communicates. The valve 51 comprises a head 54 having an upper face adapted to engage with the valve seat. The head 54 is mounted on a stem 55 of which the lower end extends downwardly through the port 50 into the path of the inner free end of the shroud 11 of the cage assembly 8. When the main piston 2 and the imperforate rod 5 are in their fully retracted positions, the shroud 11 is spaced by a short distance from the stem 55 so that, due to the spring loading, the head 54 is urged against the valve seat 52 to prevent fluid under pressure being supplied to the first pressure space 42 from the hydraulic supply.

The reservoir and the hydraulic accumulator or pump, which comprises the source of fluid under pressure, provide a closed circuit connected at opposite ends between the ports 44 and 50 in the wall of the cylinder body 1 controlled by the tilting valves 47 and 51 and a non-return valve is located in the line between the hydraulic accumulatpr or pump and the tilting valve 51 to prevent the return of hydraulic fluid from the pressure space 42 to the hydraulic accumulator or pump when the tilting valve 51 is open.

When a pedal connected to the first piston 2 is depressed to apply the brakes, with the high pressure source operative, the piston 2 and the imperforate rod 5 are moved forwardly through a small distance. Due to the force in the compression spring 13, the cage assembly 18 is moved with the rod 5 through a corresponding distance against the force in the compression spring 14. The shroud 11 moves out of contact with the stem 49 to allow the tilting valve 47 to close due to its spring loading. Thereafter a small additional forward movement of the cage assembly 8 opens the other tilting valve 51, by the engagement of its stem 55 with the inner free end of the shroud 11. This permits fluid from the high pressure source to enter the first pressure space 42 and to pass to the slave cylinders of the primary brake system of the vehicle through the outlet port 43. In this position the nose portion 7 at the free end of the rod 5 is spaced by a small distance from the annular sealing ring 40 in the inner piston 36 of the secondary piston assembly 17. Simultaneously, the high pressure fluid acts on the partition 26 of the outer piston 25 to advance it in the bore and this high pressure fluid also pressurises a chamber 56 between the communicating bores of the inner and outer pistons 25 and 36. Movement of the outer piston 25 is assisted by the compression spring 41, and the end portion of the outer piston 25 of reduced diameter sweeps through the seal 30 which in turn seals against the full diameter of the outer piston 25 at a position inwardly from the port 31 to cut off communication between the port 32 and the pressure space 33. Thereafter, upon further movement of the outer piston 25 in the same direction, fluid under pressure is delivered to the slave cylinders of the secondary brake system from the second pressure space 33 through the port 34.

In the event of failure of the high pressure source of the pressure space 42 when the brakes are being applied, the nose portion 7 of the imperforate rod 5 is spaced by a small distance from the annular sealing ring 40. In this position the cage assembly 8 is prevented from advancing further in the bore by the engagement of the shroud 11 with the stem 55 of the tilting valve 51 which acts as a stop. Further movement of the pedal causes the rod 5 to slide through the flange 9 against the force in the compression spring 13 and take up the small clearance between the rod 5 and the sealing ring 40 so that the nose portion 7 enters the opening 39 and seals with the sealing ring 40. The column of fluid in the inner piston 36 which is sealed between the rod 5 and the seal 40, forms a substantially incompressible strut whereby further movement of the rod 5 to advance the inner piston 36 causes the outer piston 25 to be advanced with it to deliver fluid under pressure from the second pressure space 33 to the secondary brake system.

The length of the column of hydraulic fluid within the chamber 56 is regulated substantially in accordance with the distance by which the outer piston 25 has been advanced in the bore relative to the inner piston 36. The provision of this hydraulic column ensured that the imperforate rod 5 is moved only minimum distance to effect direct engagement with, and operation of, the sondary piston assembly 17 in the event of failure of the high pressure source or pressure space 42 or its associated primary brake circuit.

I claim:

1. A master cylinder for use in an hydraulic braking system comprising a cylinder body having a bore, a positively actuated main piston assembly working in a portion of said bore, a secondary piston located in said bore between said main piston assembly and one end of said cylinder body, a main pressure space in said bore defined between adjacent ends of said main piston assembly and said secondary piston, a first inlet passage in said cylinder body for connection to a source of hydraulic fluid under pressure and in communication with said main pressure space, a second inlet passage in said cylinder body for connection to a reservoir for fluid and in communication with said main pressure space, a normally closed first valve controlling communication between said first inlet passage and said main pressure space and adapted to open when said main piston is advanced in said bore, a normally open second valve controlling communication between said second inlet passage and said main pressure space and adapted to close when said main piston is advanced in said bore before said first valve opens, closure of said second valve and opening of said first valve causing pressurization of said main pressure space which acts to advance said secondary piston, a second pressure space between said secondary piston and said one end of the cylinder body, a third inlet passage in said cylinder body for connection to a reservoir for fluid and in communication with said second pressure space, an outlet port in said cylinder body in communication with said second pressure space and adapted to be connected to a wheel brake, first and second axially spaced stationary annular seals fixed in said bore, the secondary piston working through said seals and the third inlet passage in communication with a chamber defined in said bore between said seals, said secondary piston having a recuperation port normally providing communication between said chamber and said second pressure space, a hollow inner piston working in an axially extending bore in the end of said secondary piston adjacent said main piston assembly, and an axial extension associated with said main piston assembly normally spaced from the adjacent end of said inner piston being adapted to engage and to close said inner piston upon failure of said main pressure space, whereby movement of said main piston assembly is transmitted directly to said piston through said inner piston and a column of hydraulic fluid trapped in the axially extending bore in which said inner piston works.

2. A master cylinder for use in an hydraulic braking system comprising a cylinder body having a bore, a positively actuated main piston assembly working in a portion of said bore, a secondary piston located in said bore between said main piston assembly and one end of said cylinder body, a main pressure space in said bore defined between adjacent ends of said main piston assembly and said secondary piston, a first inlet passage in said cylinder body for connection to a source of hydraulic fluid under pressure and communicating with said main pressure space, a second inlet passage in said cylinder body for connection to a reservoir for fluid and communicating with said main pressure space, a normally closed first valve controlling communication between said first inlet passage and said main pressure space and adapted to open when said main piston is advanced in said bore, a normally open second valve controlling communication between said second inlet passage and said main pressure space and adapted to close when said main piston is advanced in said bore before said first valve opens, closure of said second valve and opening of said first valve causing pressurization of said main pressure space which acts to advance said secondary piston, first and second annular bearing members secured in said bore at a fixed axial spacing, an annular seal housed in an annular recess in each bearing member, the secondary piston supported in said bearing members and working through said seals, said cylinder body having a third inlet passage communicating with a constant volume chamber defined in said bore between said seals and adapted to be connected to a reservoir for hydraulic fluid, a second pressure space defined by a portion of said bore beyond one end of said secondary piston and the seal in said first bearing member which is located adjacent to the said one end of said secondary piston, said secondary piston having a radial recuperation port normally providing communication between said chamber between said seals and an axially extending recess in said secondary piston opening into said second pressure space, and said cylinder body having an outlet port communicating with said second pressure space and adapted to be connected to a wheel brake, the arrangement being such that when said secondary piston is advanced in said bore into said second pressure space, said recuperation port is closed by the seal in said first bearing member and thereafter further movement of said secondary piston in the same direction pressurizes hydraulic fluid in said second pressure space.

* * * * *